(12) United States Patent
Wang et al.

(10) Patent No.: US 9,747,441 B2
(45) Date of Patent: *Aug. 29, 2017

(54) PREVENTING PHISHING ATTACKS

(75) Inventors: Bin Wang, Beijing (CN); Lin Xie, Beijing (CN); Yin Song, Beijing (CN); Lei Zhang, Beijing (CN); Man Sun, Beijing (CN); Dong Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 856 days.

This patent is subject to a terminal disclaimer.

(21) Appl. No.: 13/564,797

(22) Filed: Aug. 2, 2012

(65) Prior Publication Data

US 2013/0031628 A1 Jan. 31, 2013

Related U.S. Application Data

(63) Continuation of application No. 13/543,935, filed on Jul. 9, 2012.

(30) Foreign Application Priority Data

Jul. 29, 2011 (CN) .......................... 2011 1 0215504

(51) Int. Cl.
*H04L 29/06* (2006.01)
*G06F 21/56* (2013.01)
(Continued)

(52) U.S. Cl.
CPC .............. *G06F 21/56* (2013.01); *G06F 21/54* (2013.01); *G06F 21/577* (2013.01)

(58) Field of Classification Search
CPC .............. H04L 12/585; H04L 12/5855; H04L 12/5865; H04L 51/12; H04L 51/14;
(Continued)

(56) References Cited

U.S. PATENT DOCUMENTS 6,230,153 B1 * 5/2001 Howard et al.
6,442,606 B1 * 8/2002 Subbaroyan et al. ........ 709/224
(Continued)

FOREIGN PATENT DOCUMENTS

CN 101667979 A 3/2010
CN 101820366 A 9/2010
WO WO 2007/096659 A1 8/2007

OTHER PUBLICATIONS

Thomas, K., et al, 'Design and Evaluation of a Real-Time URL Spam Filtering Service', Proceedings of the 2011 IEEE Symposium on Security and Privacy, p. 447-462, May 22-25, 2011, http://www.icir.org/vern/papers/monarch-oak11.pdf.*
(Continued)

*Primary Examiner* — Luu Pham
*Assistant Examiner* — Ronald Baum
(74) *Attorney, Agent, or Firm* — Yee & Associates, P.C.; Richard A. Wilhelm (57) ABSTRACT

A method, system and program product for preventing phishing attacks, wherein the method comprises: acquiring links in a Web page; classifying the acquired links according link types; and determining whether a phishing attack exists according to the classified links, wherein the links are classified into two types: internal links belonging to the same domain as the address of the Web page, and external links belonging to a different domain from the address of the Web page. By carrying out the method or system according to the above one or more embodiments of the present disclosure, since it is first detected whether a Web page is a fake website of a phishing attack before displaying the reproduced Web page to the user and the user is warned upon detecting a fake website, unnecessary losses due to phishing attacks can be prevented.

12 Claims, 3 Drawing Sheets

(51) Int. Cl.
*G06F 21/54* (2013.01)
*G06F 21/57* (2013.01)

(58) Field of Classification Search
CPC ......... H04L 51/20; H04L 51/28; H04L 61/30;
H04L 61/309; H04L 61/3005; H04L
61/3085; H04L 63/0227; H04L 63/0236;
H04L 63/0263; H04L 63/0407; H04L
63/0823; H04L 63/1408; H04L 63/1416;
H04L 63/1433; H04L 63/1441; H04L
63/1466; H04L 63/1483; G06F 17/30876;
G06F 17/30882; G06F 17/30887; G06F
21/00
USPC ........................................................ 726/22
See application file for complete search history.

(56) References Cited

U.S. PATENT DOCUMENTS

| | | | |
|---|---|---|---|
| 6,691,163 B1* | 2/2004 | Tufts ........................... 709/224 |
| 6,819,340 B2* | 11/2004 | Burke ................ G06F 17/3089 |
| | | 707/E17.116 |
| 7,441,044 B2* | 10/2008 | Hegerty et al. .............. 709/238 |
| 7,634,809 B1* | 12/2009 | Schneider et al. ............. 726/22 |
| 7,634,810 B2 | 12/2009 | Goodman et al. |
| 7,668,921 B2* | 2/2010 | Proux et al. .................. 709/206 |
| 7,681,234 B2* | 3/2010 | Florencio et al. ............. 726/22 |
| 7,802,298 B1* | 9/2010 | Hong et al. ..................... 726/22 |
| 7,849,507 B1* | 12/2010 | Bloch et al. .................... 726/22 |
| 7,854,001 B1 | 12/2010 | Chen et al. |
| 7,975,010 B1* | 7/2011 | Satish ........................... 709/206 |
| 8,020,206 B2* | 9/2011 | Hubbard et al. ............... 726/22 |
| 8,171,085 B1* | 5/2012 | Tevanian, Jr. ................ 709/206 |
| 8,312,538 B2* | 11/2012 | Ogawa ........................... 726/22 |
| 8,321,936 B1* | 11/2012 | Green et al. .................... 726/23 |
| 8,346,878 B2* | 1/2013 | Bhogal et al. ................ 709/206 |
| 8,429,545 B2* | 4/2013 | Dixon et al. .................. 715/760 |
| 8,468,597 B1* | 6/2013 | Warner et al. .................. 726/22 |
| 8,521,667 B2* | 8/2013 | Zhu et al. ....................... 706/13 |
| 8,560,413 B1* | 10/2013 | Quarterman et al. ......... 705/35 |
| 2005/0076222 A1* | 4/2005 | Olkin et al. .................. 713/176 |
| 2006/0015563 A1* | 1/2006 | Judge et al. .................. 709/206 |
| 2006/0015722 A1* | 1/2006 | Rowan et al. ................ 713/166 |
| 2006/0080735 A1 | 4/2006 | Brinson et al. |
| 2006/0129644 A1* | 6/2006 | Owen et al. .................. 709/206 |
| 2006/0168006 A1* | 7/2006 | Shannon .............. G06Q 10/107 |
| | | 709/206 |
| 2006/0168066 A1* | 7/2006 | Helsper et al. ............... 709/206 |
| 2006/0168202 A1* | 7/2006 | Reshef et al. ................ 709/224 |
| 2006/0212930 A1* | 9/2006 | Shull et al. ...................... 726/10 |
| 2007/0107053 A1* | 5/2007 | Shraim et al. .................. 726/22 |
| 2007/0118528 A1* | 5/2007 | Choi et al. ....................... 707/9 |
| 2007/0192855 A1* | 8/2007 | Hulten et al. ................... 726/22 |
| 2008/0028444 A1* | 1/2008 | Loesch et al. .................... 726/4 |
| 2008/0127319 A1* | 5/2008 | Galloway et al. ............... 726/9 |
| 2008/0172738 A1* | 7/2008 | Bates et al. ..................... 726/22 |
| 2009/0055928 A1 | 2/2009 | Kang et al. |
| 2009/0077383 A1* | 3/2009 | de Monseignat et al. .... 713/175 |
| 2009/0089859 A1* | 4/2009 | Cook et al. ....................... 726/3 |
| 2009/0182818 A1* | 7/2009 | Krywaniuk ................... 709/206 |
| 2010/0043071 A1 | 2/2010 | Wang |
| 2010/0235915 A1* | 9/2010 | Memon ................. H04L 63/145 |
| | | 726/23 |
| 2010/0281536 A1* | 11/2010 | Richards et al. ............... 726/22 |
| 2010/0313266 A1* | 12/2010 | Feng et al. ..................... 726/23 |

OTHER PUBLICATIONS

Basnet, R., et al, 'Rule-Based Phishing Attack Detection', Proceedings of the International Conference on Security and Management-SAM'11, Las Vegas, NV, USA, 2011, entire document, https://pdfs.semanticscholar.org/59ff/ef403f9f2f0389a5231f530ad9d9215443a8.pdf.*

Soman et al., "An Intelligent System for Phish Detection, using Dynamic Analysis and Template Matching", World Academy of Science, Engineering and Technology, Published in 2008, http://www.akademik.unsri.ac.id/download/journal/files/waset/v42-59.pdf, pp. 321-327.

Zhang et al., "Cantina: A Content-Based Approach to Detecting Phishing Web Sites", Proceedings of the 16th International World Wide Web Conference (WWW2007), May 8-12, 2007, http://citeseerx.ist.psu.edu/viewdoc/download?doi=10.1.1.72.2809&rep=rep1&type=pdf, 10 pages.

Wang et al, "Method and System for Preventing Phishing Attacks", U.S. Appl. No. 13/543,935, Jul. 9, 2012, 25 pages.

Office Action, dated Jan. 9, 2014, regarding U.S. Appl. No. 13/543,935, 26 pages.

Final Office Action, dated Mar. 12, 2014, regarding U.S. Appl. No. 13/543,935, 26 pages.

* cited by examiner

PREVENTING PHISHING ATTACKS

CROSS-REFERENCE TO RELATED APPLICATION(S)

This application is a continuation of and claims the benefit of priority to U.S. patent application Ser. No. 13/543,935, filed on Jul. 9, 2012 and entitled "Method and System for Preventing Phishing Attacks", which claims the benefit of priority to Chinese Patent Application No. 201110215504.1, filed on Jul. 29, 2011, the contents of which are hereby incorporated by reference.

TECHNICAL FIELDS

The present invention relates to network security, more particularly, to a method and system for preventing phishing attacks.

DESCRIPTION OF THE RELATED ART

Phishing attack is a criminal fraud procedure that attempts to obtain personal sensitive information like usernames, passwords and credit card details, etc. by using electronic communications to disguise as a creditworthy legal person media. These communications usually claim that they are from Internet banks, electronic payment websites, online retailers, credit card companies or network administrators, to deceive credulous victims. Phishing attacks are usually carried out through emails or instant messages. Phishing attacks usually direct the user to a fake website with an interface appearance highly similar to the genuine legitimate website, to deceive the user to input personal sensitive information. These fake websites usually have Web pages highly similar to the Web pages of trustworthy brands such as Internet banks, electronic payment websites, online retailers and credit card companies, etc., and the victims would often leak their sensitive information such as credit card numbers, bank card accounts, and ID card numbers and so on. Currently there are many methods and tools to help users to find out these fake websites and to avoid exposing their private information, e.g., by SSL secure connection, digital certificates, or establishing a blacklist for shielding against phishing websites. However, these methods have their respective disadvantages, although they can solve part of the problems. For example, it is still difficult to detect whether a website is a fake website even through a SSL secure connection.

SUMMARY OF THE INVENTION

Illustrative embodiments of the present disclosure have recognized the above disadvantages in the prior art. To this end, the present disclosure provides a lightweight solution capable of helping ordinary users to identify some common type of phishing attacks and thus to prevent unnecessary losses caused thereby.

According to an embodiment of the present disclosure, there is provided a method for preventing phishing attacks, comprising: scanning a Web page; acquiring links in a Web page; classifying the acquired links according to link types; and determining whether a phishing attack exists according to the classified links, wherein the links are classified into two types: internal links belonging to the same domain as the address of the Web page, and external links belonging to a different domain from the address of the Web page.

According to another embodiment of the present disclosure, the determining whether a phishing attack exists according to the classified links comprises calculating the percentage of the links of a respective type in the total number of links; comparing the calculated percentage of the links of a respective type in the total number of links with a preset threshold; and determining whether a phishing attack exists using the comparison result.

According to another embodiment of the present disclosure, the determining whether a phishing attack exists using the comparison result comprises: in response to the comparison result indicating that the internal links are less than the preset threshold, warning the user of a possible phishing attack.

According to another embodiment of the present disclosure, the determining whether a phishing attack exists using the comparison result comprises: in response to the comparison result indicating that the internal links are not less than the preset threshold, displaying the Web page to the user.

According to another embodiment of the present disclosure, the determining whether a phishing attack exists using the comparison result comprises: in response to the comparison result indicating that the external links are not less than the preset threshold, warning the user of a possible phishing attack.

According to another embodiment of the present disclosure, the determining whether a phishing attack exists using the comparison result comprises: in response to the comparison result indicating that the external links are less than the preset threshold, displaying the Web page to the user.

According to an embodiment of the present disclosure, there is provided a system for preventing phishing attacks, comprising: an acquiring component configured to acquire links in a Web page; a classifying component configured to classify the acquired links according to link types; and a determining component configured to determine whether a phishing attack exists according to the classified links, wherein the links are classified into two types: internal links belonging to the same domain as the address of the Web page, and external links belonging to a different domain from the address of the Web page.

Furthermore, an embodiment of the present disclosure further provides a computer program product corresponding to the above method.

By implementing the method or system according to the above one or more embodiments of the present disclosure, since a reproduced Web page is first detected to determine whether it is a fake website of a phishing attack before it is displayed to the user and the user is warned upon detecting a fake website, unnecessary losses due to phishing attacks can be prevented.

BRIEF DESCRIPTION OF THE ACCOMPANYING DRAWINGS

The present disclosure may be better understood by referring to the following description when read in conjunction with the accompanying drawings, wherein the same or similar reference numerals are used to denote the same or similar components. The accompanying draws together with the following detailed description are included in the specification and form part thereof, to further illustrate preferred embodiments of the present disclosure and to explain the principles and advantages of the present disclosure. In the drawings.

DETAILED DESCRIPTION OF EXEMPLARY EMBODIMENTS

In the following will be described exemplary embodiments of the present disclosure in conjunction with the accompanying drawings. For clarity and simplicity, not all the features of the actual embodiments are described herein. However, it should be understood that many decisions specific to the actual embodiments must be made during the process of developing the actual embodiments, so as to realize the specific objects of the developers, e.g., complying with those constraints related to the system and business, which constraints may change with different embodiments. In addition, it should be further understood that although the development may be complex and time-consuming, the development work is merely routine tasks for those skilled in the art with the benefits of the contents of the present disclosure.

It should also be pointed out here that, in order to prevent the present disclosure to be unnecessarily blurred by details, the drawings only illustrate the apparatus structures and/or processing steps closely related to the solutions according to the present disclosure while omitting the other details with little relevance to the present disclosure.

The attackers of a phishing attack usually constructs a fake website utilizing the resources of a genuine legitimate website, that is, webpage resources like styles, images and links, etc. of a fake website will be acquired from the genuine legitimate website, thus, the user interface appearance of the fake website is usually highly similar to the genuine legitimate website, so as to easily obtain the trust of users and thus to deceive the users. The attacker usually directs the parts, in the fake website highly similar to the genuine legitimate website, requiring the user to input and submit personal sensitive information to a preset address, thereby, when the user inputs and submits personal sensitive information, it seems to the user that he has submitted the personal sensitive information to the genuine legitimate website, while actually he has submitted the personal sensitive information to the attacker of the phishing attack.

With respect to the above common phishing attack method, there is provided a method and system according to one or more embodiments of the present disclosure.

In the following, embodiments of the method and system for preventing phishing attacks according to the present disclosure will be described in detail in conjunction with the figures.

Figure 1:
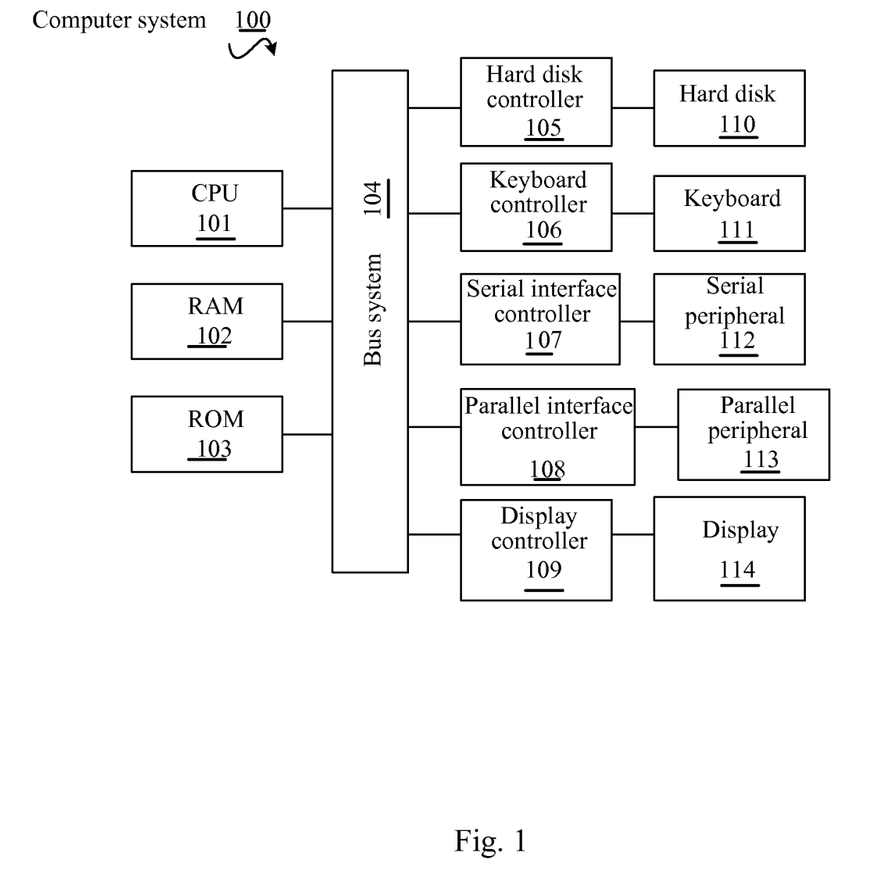
FIG. 1 shows a block diagram of an exemplary computer system 100 suitable for realizing embodiments of the present invention.

Now referring to FIG. 1, it shows a block diagram of an exemplary computer system 100 suitable for realizing one or more embodiments of the present disclosure. As shown, the computer system 100 includes: CPU (Central Processing Unit) 101, RAM (Random Access Memory) 102, ROM (Read-Only Memory) 103, system bus 104, hard disk controller 105, keyboard controller 106, serial interface controller 107, parallel interface controller 108, display controller 109, hard disk 110, keyboard 111, serial peripheral device 112, parallel peripheral device 113 and display 114.

In these devices, those coupled with the system bus 104 are CPU 101, RAM 102, ROM 103, hard disk controller 105, keyboard controller 106, serial controller 107, parallel controller 108 and display controller 109. Hard disk 110 is couple with hard disk controller 105, keyboard 111 is coupled with keyboard controller 106, serial peripheral device 112 is coupled with serial interface controller 107, parallel peripheral 113 is coupled with parallel interface controller 108, and display 114 is couple with display controller 109. It should be understood that the block diagram of FIG. 1 is only shown for the purpose of exemplification, rather than limitation to the scope of the present invention. In some circumstances, some devices may be added or removed as required by specific conditions.

Figure 2:
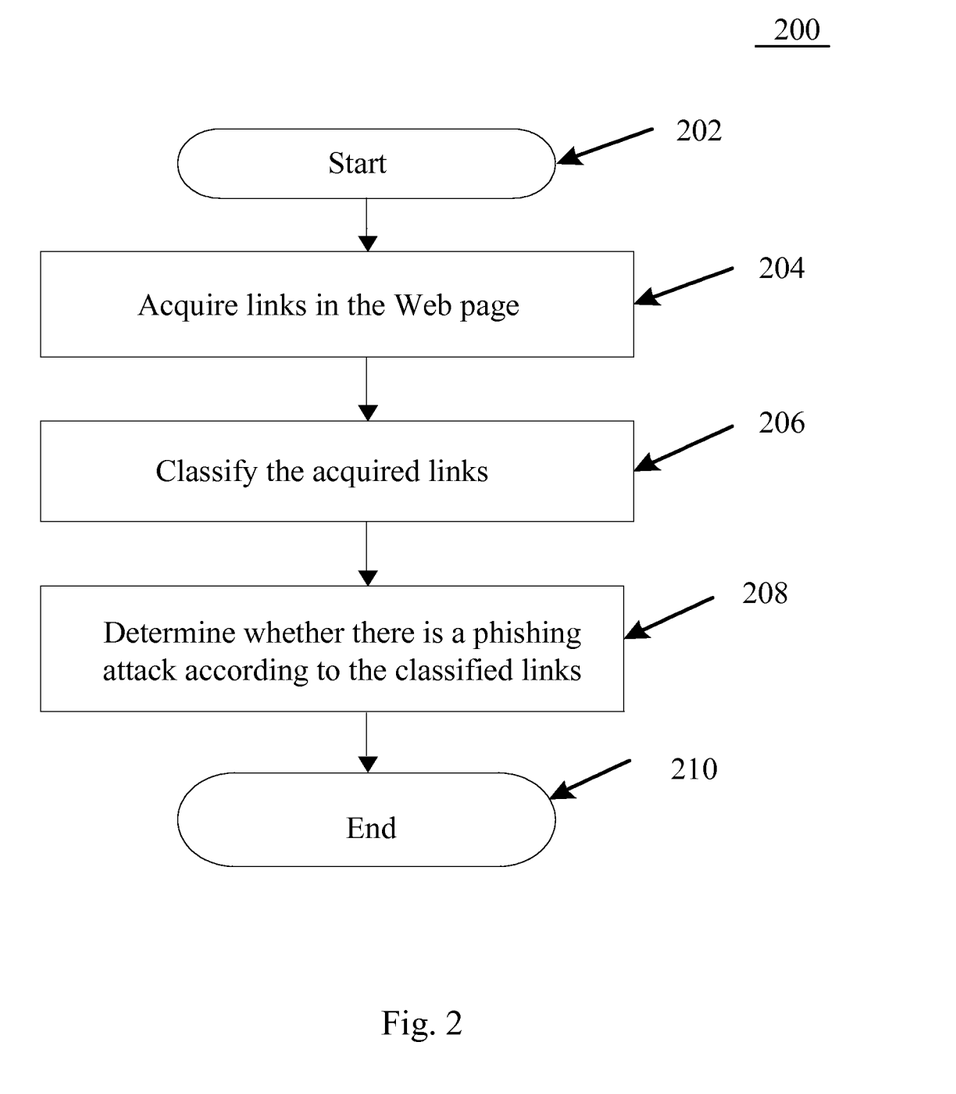
FIG. 2 shows a flowchart of a method 200 for preventing phishing attacks according to an embodiment of the present disclosure.

Now referring to FIG. 2, it illustrates a flowchart of a method 200 for preventing phishing attacks according to an embodiment of the present invention. The method 200 for preventing phishing attacks according to an embodiment of the present invention begins with step 202.

Next, the method 200 proceeds to step 204, in which the links in the Web page are acquired. The links in the Web page may be acquired by scanning the source code of the Web page. These links include:

HTML <a> href attribute, which specifies the address to which a link is directed;

HTML <script> src attribute, which specifies the source address of an external script file;

HTML <img> src attribute, which specifies the source address of an image;

HTML <iFrame> src attribute, which specifies the source address of the document to be displayed in the iFrame;

HTML <Form> Action attribute, which specifies the target address to which the form is submitted, and so on.

Above are listed some examples of attributes related to links in HTML. It should be understood that above are listed only some examples of links in Web page, and other HTML tags and attributes related to links, or tags, attributes and contents related to links in other markup languages such as XHTML, XML, etc., are known to the skilled in the art and not listed here.

According to observation of the inventor of the present disclosure, a fake website constructed using the resources of the genuine legitimate website generally have same features, i.e., 1) Most resources in the Web page of a fake website are acquired from the genuine legitimate website;
2) The parts that require a user to input and submit sensitive information are directed to an address preset by the attacker;
3) The address of the fake website and that of the genuine legitimate website belong to different domains;
4) The address preset by the attacker and that of the genuine legitimate website belong to different domains.

In the following is an example of a fake website; the attacker fakes as HSBC to send an email or an IM (instant messaging) message to a user, when the user clicks the link in the email or IM message sent by the attacker, he will be directed to a fake website with the address of http://qingadian.com/. The fake website has a highly similar webpage to that of the genuine HSBC website, so as to deceive the user to input personal sensitive information. The genuine legitimate HSBC website is http://www.hsbc.com.hk/. It can be seen by checking the code of the fake website that most resources in the fake website page are acquired from the genuine legitimate website; refer to the code segments given below.

```
<script src='/1/PA_1_3_S5/content/hongkongpws/theme/js/pws_default.js' type=
    "text/JavaScript"></script>
  <div class="containerGlobal"><div class="containerEntity"><div class="hsbcEntity">
  <div class="hsbcEntityTextArea01">Hong Kong</div>
  <div class="hsbcEntityTextArea02">
    <ul>
      <li class="hsbcEntityTabSelected"><a href="/1/2/home?fbc=HomeEngTopMenu">
        Home</a></li>
      <li><a href="/1/2/hk/personal?fbc=HomeEngTopMenu">Personal</a></li>
      <li><a href="/1/2/hsbcpremier/home?fbc=HomeEngTopMenu">HSBC Premier</a></li>
      <li><a href="/1/2/hsbcadvance/home?fbc=HomeEngTopMenu">HSBC Advance</a></li>
      <li><a href="http://www.commercial.hsbc.com.hk/1/2/commercial/home" 'width=
          '+screen.width+', height='+screen.height*0.88+',location=yes,directories=no,
          menubar=yes,toolbar=yes,scrollbars=yes,status=yes, resizable=yes,left=0,top=0');
          return false;">Commercial</a></li>
      <li><a href="http://www.hsbcnet.com/hsbc" target="_blank" onclick="window.open
          ('http://www.hsbcnet.com/hsbc','_blank','width='+screen.width+',height='+screen.
          height*0.88+',location=yes,directories=no,menubar=yes,toolbar=yes,scrollbars=yes,
          status=yes,resizable=yes,left=0,top=0');return false;">Corporate</a></li>
      <li><a href="/1/2/mpf/home?fbc=HomeEngTopMenu">MPF</a></li>
      <li><a href="/1/2/hsbcgreaterchina?fbc=HomeEngTopMenu">Greater China</a></li>
      <li><a href="/1/2/about/home?fbc=HomeEngTopMenu">About HSBC</a></li>
      <li><a href="/1/2/careers/home?fbc=HomeEngTopMenu">Careers</a></li>
      <li><a href="/1/2/contact-us?fbc=HomeEngTopMenu">Contact us</a></li>
    </ul>
  </div>
  </div>
  </div></div></div>
  ... ....
<p class="red"><strong>Personal Internet Banking</strong><br />
<span style="display:block;float:left;"><a href="javascript:void(0)"
onclick="window.open('http://qingadian.com/qingdaohuadian/CRM/login/IBlogin.html;
'width='+screen.width+',height='+screen.height*0.88+',location=no, directories=no,
menubar=no,toolbar=no,scrollbars=yes,status=yes,resizable=yes,left=0,top=0');
onclick="window.open "><img src="/1/PA_1_3_S5/content/hongkongpws/hk_home/
images/logon.gif" alt="Logon" /></a></span>
```

It may be clearly seen from code of the fake website given above that, most webpage resources in the fake website are acquired from the genuine legitimate website, while the part requiring the user to input personal sensitive information are directed to the address preset by the attacker, i.e., http://qiangadian.com/qingdaohua-dian/CRM/login/IBlogin.html. In other words, the user will be directed to the above address by clicking the Logon button on the fake website.

According to an embodiment of the present disclosure, the links are classified into two types:
1) internal links, whose link addresses belong to the same domain as the address of the Web page;
2) external links, whose link addresses belong to a different domain from the address of the Web page;
wherein the user access the above Web page by clicking the link in the email or IM message.

Here the domain refers to a domain name. It is believed that links of different domain names belonging to a same company are of the same type. For example, the domain names of www.qq.com, www.tencent.com, etc. belong to Tencent Corp., i.e., links involving the above two domain names are links of the same type; similarly, the domain names of www.sina.com, www.sinaimg.com, weibo.com, etc. all belong to Sina Corp.; and the domain names of www.boc.cn, www.bankofchina.com, etc. all belong to Bank of China, and so on. Different domain names belonging to a same company may be stored in advance in a database in the form of a list or in other forms. In other words, if the domain name corresponding to the address of a link and the domain name corresponding to the address of the Web page are identical or belong to the same company, then this link is an internal link. If the domain name corresponding to the address of a link and the domain name corresponding to the address of the Web page are not identical, nor they belong to the same company, then the link is an external link.

Next, the method 200 proceeds to step 206, in which the acquired links are classified. As mentioned above, the links are classified into the two types of internal links and external links according to an embodiment of the present disclosure. At step 206, the acquired links are classified according to the link types, i.e., whether they belong to internal links or external links. Thus, after step 206 is performed, the number of the links belonging to internal links and the number of the links belonging to external links are obtained.

According to an embodiment of the present disclosure, in the process of acquiring the links in the Web page or classifying the links, common links of third-party legitimate websites that provide services, such as Google® AdWords® that provides advertising services, or Microsoft® Bing® that provides searching services, etc., may be excluded. These third-party legitimate websites that need to be excluded may be stored in advance in a database in the form of a list or in other forms, so that the links of the common third-party legitimate websites that provide services may be excluded by means of querying the list in the process of acquiring links in the Web page or classifying the links.

Next, the method 200 proceeds to step 208, in which it is determined whether there is a phishing attack according to the classified links. According to an embodiment of the present disclosure, it is determined whether there is a phishing attack according to the classified links by calculating the percentage of the links of a respective type in the total number of links; and comparing the calculated percentage of the links of the respective type in the total number of links with a preset threshold. According to an embodiment of the present disclosure, links are classified into internal links and external links, and the percentages of internal links and external links in the total number of links are calculated. Then, the calculated percentage of internal links in the total number of links is compared with a preset threshold, and if the comparison result indicates that the internal links are less than the preset threshold, the user is warned of a possible phishing attack. If the comparison result indicates that the internal links are not less than the preset threshold, the reproduced Web page is displayed to the user.

According to another embodiment of the present disclosure, the calculated percentage of external links in the total number of links is compared with a preset threshold, and if the comparison result indicates that the external links are not less than the preset threshold, the user is warned of a possible phishing attack. If the comparison result indicates that the external links are less than the preset threshold, the reproduced Web page is displayed to the user.

Taking the above fake website as an example, assuming that the user clicks the link in the email or IM message that is sent by the attacker, he will then be directed to the address http://qingadian.com/. By scanning the page corresponding to the above address, all links therein are acquired. Then, the acquired links in the page are classified according to the link types, i.e., whether they belong to the internal links or external links, and the percentage of the links of a respective type in the total number of links is calculated. For the above fake website, since most page resources of the fake website are acquired from the genuine legitimate website http://www.hsbc.com.hk/, the number of internal links belonging to the same domain as the address (i.e., http://qiangadian.com/) accessed by user by clicking is small (usually only the links corresponding to the parts that require the user to input personal sensitive information), while most links are from the genuine legitimate website, i.e., http://www.hsbc.com.hk/. If the address accessed by user by clicking were the genuine legitimate website, i.e., http://www.hsbc.com.hk/, the internal links belonging to the same domain as the address accessed by user by clicking should have been the majority. Therefore, assume that the preset threshold of internal links in the total number of links is 80%. If the user accesses the fake website by clicking, the number of internal links belonging to the same domain as the address accessed by the user by clicking is small. Assume that in this case the percentage of internal links in the total number of links is approximately 5%. Since 5% is much smaller than 80%, this indicates that there may be a phishing attack, in which case the user is warned of a possible phishing attack.

Above are described the method and system according to one or more embodiments of the present disclosure. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
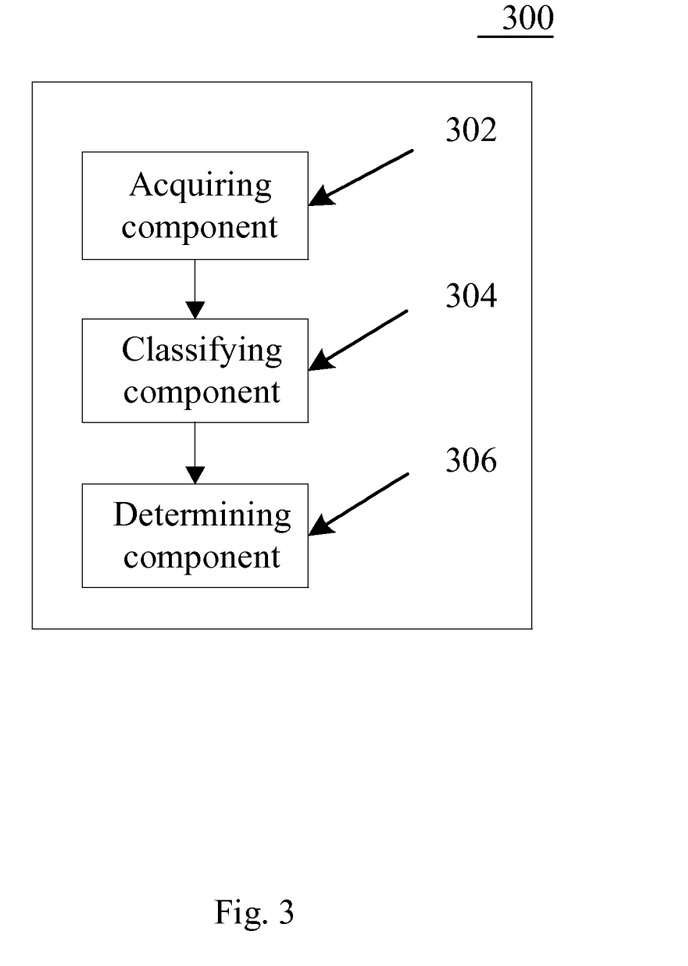
FIG. 3 shows a block diagram of a system 300 for preventing phishing attacks according to an embodiment of the present disclosure.

Now referring to FIG. 3, it illustrates a block diagram of a system 300 for preventing phishing attacks according to an embodiment of the present invention.

The system 300 for preventing phishing attacks according to an embodiment of the present disclosure comprises: an acquiring component 302 configured to acquire the links in a Web page; a classifying component 304 configured to classify the acquired links according to link types; and a determining component 306 configured to determine whether there is a phishing attack according to the classified links, wherein the links are classified into two types: internal links belonging to the same domain as the address of the Web page and external links belonging to a different domain from the address of the Web page. According to an embodiment of the present disclosure, the acquiring component 302 is further configured to acquire links in the Web page by scanning the source code of the Web page.

According to an embodiment of the present disclosure, the system 300 for preventing phishing attacks further comprises: an calculating component (not shown) configured to calculate the percentage of the links of a respective type in the total number of links; and a comparing component (not shown) configured to compare the percentage of the links of the respective type in the total number of links with a preset threshold.

According to an embodiment of the present disclosure, the system 300 for preventing phishing attacks further comprises: a warning component (not shown) configured to warn the user of a possible phishing attack in response to the comparison result indicating that the internal links are less than a preset threshold; and a displaying component (not shown) configured to display the Web page to the user in response to the comparison result indicating that the internal links are not less than the preset threshold.

According to an embodiment of the present disclosure, the system 300 for preventing phishing attacks further comprises: a warning component (not shown) configured to warn the user of a possible phishing attack in response to the comparison result indicating that the external links are not less than the preset threshold; and a displaying component (not shown) configured to display the Web page to the user in response to the comparison result indicating that the external links are less than the preset threshold.

Those skilled in the art will appreciate that aspects of the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in a medium of expression having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer readable signal medium may include a propagated data signal with the computer-usable program code embodied therewith, either in baseband or as part of a carrier wave. The propagated signal can be in various forms, including but not limited to, electromagnetic signals, optical signals, or any suitable combination of the foregoing. The computer readable signal medium can be any computer readable medium that is not a computer readable storage medium, but that can transmit, propagate or transport a program for use by or in connection with an instruction execution system, apparatus or device.

The program code embodied in the computer readable medium may be transmitted using any appropriate medium, including but not limited to wireless, wireline, optical fiber cable, RF, etc, or any suitable combination of the foregoing.

Computer program code for carrying out operations in embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to the flowchart illustrations and/or block diagrams of the methods, apparatus (systems) and computer product. It will be understood that, each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It should be further pointed out that in the apparatus and method of the present disclosure, obviously the components or steps may be decomposed and/or recombined. The decomposition and/or recombination may be viewed as equivalent solutions of the present disclosure. Moreover, the steps executing the above series of processing may be naturally performed in time order according to the sequence of the description, but they may not necessarily be performed in time order. Some steps may be performed in parallel or independently of each other.

Although the present disclosure and advantages thereof have been described in detail, it will be understood that various changes, substitution and transformation may be made thereto without departing from the spirit and scope of the present disclosure. Further, the terms "comprises", "comprising," or any variants thereof are intended to cover nonexclusive inclusion, such that a process, method, article or apparatus comprising a series of elements may not only comprise those elements, but may also comprise other elements, or comprise elements inherent to the process, method, article or apparatus. Without further limitation, an element specified by the phrase "comprising a" does not exclude the presence of other identical elements in the process, method, article or apparatus comprising the element.

The invention claimed is:

1. A method performed by a data processing system for preventing phishing attacks, comprising:
    acquiring, by a computing device, a plurality of links in a Web page;
    classifying, by a computing device, the acquired links according to link types to form classified links; and
    determining, by a computing device prior to conditionally displaying the Web page to a user, whether a phishing attack exists according to the classified links,
    wherein the acquired links are classified into two types:
        internal links belonging to a same domain as an internet protocol (IP) address of the Web page, and
        external links belonging to a different domain from the IP address of the Web page;
    wherein determining whether a phishing attack exists includes:
        calculating a percentage of links of a respective type in a total number of the links,
        comparing the calculated percentage of links of the respective type in the total number of links with a preset percentage threshold, and
        determining whether a phishing attack exists using the comparison result, and
    warning a user of a possible phishing attack in response to determining that the phishing attack exists.

2. The method of claim 1, wherein
the respective types are the internal links belonging to the same domain as the IP address of the Web page.

3. The method of claim 2, wherein
the comparison result indicating that calculated percentage of links is less than the preset percentage threshold.

4. The method of claim 2, wherein the step of warning a user of a possible phishing attack further comprises:

displaying the Web page to a user in response to the comparison result indicating that the calculated percentage of links is not less than the preset percentage threshold.

5. The method of claim 1, wherein the links in the Web page are acquired by scanning HTML source code of the Web page.

6. The method of claim 1, wherein certain of the plurality of links belonging to a same company are stored in a database and classified as being part of the internal links.

7. The method of claim 1, further comprising:
excluding certain links of common third-party legitimate websites providing services when classifying the acquired plurality of links.

8. The method of claim 1, wherein
the respective type are the external links belonging to the different domain from the IP address of the Web page.

9. The method of claim 8, wherein
the comparison result indicating that the calculated percentage of links is not less than the preset percentage threshold.

10. The method of claim 8, wherein the step of warning a user of a possible phishing attack further comprises:
displaying the Web page to a user in response to the comparison result indicating that the calculated percentage of links is less than the preset percentage threshold.

11. The method of claim 1, further comprising:
receiving an email containing a link to the Web page.

12. The method of claim 1, further comprising:
receiving an instant message (IM) containing a link to the Web page.

* * * * *